(12) United States Patent
Vertenten

(10) Patent No.: US 7,009,508 B2
(45) Date of Patent: Mar. 7, 2006

(54) METHOD AND APPARATUS FOR DETERMINING A BRAKE OVERHEATING CONDITION

(75) Inventor: Daniel P. Vertenten, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 16 days.

(21) Appl. No.: 10/217,071

(22) Filed: Aug. 12, 2002

(65) Prior Publication Data

US 2004/0036592 A1   Feb. 26, 2004

(51) Int. Cl.
   *B60Q 1/00*   (2006.01)
(52) U.S. Cl. .................. 340/453; 340/449; 340/454
(58) Field of Classification Search ............... 340/453, 340/449, 454, 438, 522, 441, 459, 588, 589, 340/479; 188/1.11 R, 1.11 E; 303/191, 303/192, 93; 701/29; 116/207, 208
   See application file for complete search history.

(56) References Cited

U.S. PATENT DOCUMENTS

| | | | |
|---|---|---|---|
| 3,674,114 A | 7/1972 | Howard | 188/1.11 R |
| 3,689,880 A | 9/1972 | McKee et al. | 340/454 |
| 3,975,706 A | 8/1976 | Kato | 340/454 |
| 4,270,808 A | 6/1981 | Brearley | 303/92 |
| 4,477,124 A * | 10/1984 | Watanabe | 303/191 |
| 4,569,600 A | 2/1986 | Preniczny et al. | 374/131 |
| 4,591,213 A * | 5/1986 | Rapoport | 303/191 |
| 4,649,370 A | 3/1987 | Thomason | 340/453 |
| 4,658,936 A | 4/1987 | Moseley | 188/1.11 |
| 4,790,606 A | 12/1988 | Reinecke | 303/103 |
| 4,793,661 A * | 12/1988 | Munro | 303/89 |
| 4,824,260 A | 4/1989 | Novotny et al. | 374/179 |
| 5,079,947 A | 1/1992 | Feldmann et al. | 73/129 |
| 5,302,940 A | 4/1994 | Chen | 340/454 |
| 5,581,464 A | 12/1996 | Woll et al. | 364/424.04 |
| 5,651,431 A * | 7/1997 | Kyrtsos | 188/1.11 L |
| 5,812,053 A | 9/1998 | Kovack | 340/449 |
| 5,892,437 A | 4/1999 | Scheibe et al. | 340/467 |
| 5,909,171 A | 6/1999 | Kyrtsos | 340/454 |
| 5,939,978 A | 8/1999 | Kyrtsos | 340/454 |
| 5,962,777 A * | 10/1999 | Salamat et al. | 73/121 |
| 5,983,149 A * | 11/1999 | Tate et al. | 701/48 |
| 6,112,859 A | 9/2000 | Shuck et al. | 188/1.11 L |
| 6,119,059 A | 9/2000 | Tai et al. | 701/29 |
| 6,158,822 A | 12/2000 | Shirai et al. | 303/3 |
| 6,250,430 B1 | 6/2001 | Kyrtsos | 188/1.11 L |
| 6,310,545 B1 * | 10/2001 | Sapir | 340/453 |
| 6,334,655 B1 | 1/2002 | Tanaka et al. | 303/113.4 |
| 6,341,670 B1 * | 1/2002 | Leblanc et al. | 188/1.11 L |
| 6,659,233 B1 * | 12/2003 | DeVlieg | 188/1.11 E |

* cited by examiner

*Primary Examiner*—Phung T. Nguyen

(57) ABSTRACT

A vehicle includes at least one wheel and an associated brake. Especially if the vehicle is traveling down an incline, the brake may overheat from prolonged use. The present invention provides an operator warning device which alerts the operator to a possible or actual brake overheat condition, based on any number of chosen non-temperature vehicle conditions. These conditions may include incline, machine speed, brake application pressure, and brake application duration.

21 Claims, 4 Drawing Sheets

METHOD AND APPARATUS FOR DETERMINING A BRAKE OVERHEATING CONDITION

TECHNICAL FIELD

The present invention relates to a temperature-monitoring system for a brake on a vehicle, and, more specifically, to such a system which determines and/or predicts a brake overheat condition using non-temperature characteristics of the vehicle.

BACKGROUND

A vehicle such as a work machine, wheel loader, backhoe loader, on- or off-highway truck, or the like is normally equipped with a number of wheels. Generally, the wheels are mounted in pairs on an axle. A friction-style service brake of a known type is associated either with each wheel or each axle. A "wet" axle, having axle oil or another fluid circulating within an enclosing structure, is an example of a common configuration in the industry.

Brake overheating is a very common and serious condition. The brakes can easily overheat when they are applied for a long duration, or a closely-spaced series of shorter duration applications. When a brake overheats, the two main resultant failure modes are axle oil failures (in a wet axle) and brake failures. Axle oil failure occurs because heat makes the axle oil less viscous and more "runny", with the consequence that the oil does not flow and adhere as needed to properly lubricate axle components. The axle components then can wear prematurely. Brake failures fall, for the most part, into three categories related to the friction discs: glazing, warping, and carbonization.

Glazing is the term used when the friction disc surfaces become heated, perhaps at least partially melted, and lose relative friction with their partner discs. While glazing effects the characteristics of the brake initially, as the glazed brake is applied, the glazing becomes worn away to expose the friction material beneath and the brake can eventually regain close to normal function. Warping occurs when heat causes the friction discs to twist or melt. A warped disc only frictionally engages its partner disc at high or low points along the surface of the warped or partner disc, thus exacerbating the overheating problem at those points and possibly causing a loss of braking force. Finally, carbonization is when the material which makes up the surface of the friction discs loses structural integrity because of the heat and chunks or flakes off, causing similar ill effects as does warping.

Unlike glazing, both warping and carbonization damage the brake permanently, necessitating replacement of the damaged friction discs. Brakes are extremely difficult and time-consuming to access due to their location on the vehicle, and brake components are very costly. It is thus desirable to detect or predict an overheat condition before permanent damage occurs to the brakes.

Generally, brake overheating occurs when the vehicle is traveling down an incline and the operator is "riding" the brake to control the speed of the machine by resisting gravitational force. Brakes are normally sized to bring the vehicle to a stop on level ground with an application duration of 3–5 seconds. Tests in the field have shown that permanent brake damage from overheating can begin in as short as a 15–20 second application. Though on level ground the vehicle would have long since stopped by the 15-second mark, such a damage-threshold brake application duration is often exceeded by downhill-travelling vehicles and the brakes of such a machine can overheat. A warning or prediction system is needed to alert an operator of a present or impending brake overheat event so that permanent damage can be averted or minimized.

Prior art systems often use an axle oil temperature sensor to measure an actual temperature of the axle oil and compare that temperature to a range of allowable temperatures, alerting the operator if the temperature exceeds the range. However, the sensor may be located inconveniently far from the brake because of spacing and wiring constraints and consequently may not detect all instances of brake overheating due both to the distance of the sensor from the brake and to the unpredictable circulation of axle oil. Sensors can easily malfunction in the stressful environment inside the axle or brake, as well.

Also, even when the operator is alerted of overheat conditions, damage may have already begun to occur and may become irreversible in the time that it takes the operator to stop the vehicle to let the brakes cool. Therefore, a proactive warning is desirable as long as the number and frequency of warnings without an associated overheat event are small enough that the operator does not disregard the warning.

Additionally, cooling of an overheated brake sufficient to allow further use generally takes on the order of 15–30 seconds, depending upon the temperature of the brake and the setup of the vehicle. Operators are often held to a tight work cycle schedule and may wish to minimize stopped time. If the brakes are not permitted to fully cool before vehicle travel resumes, a low-level overheat situation results. While no permanent warping or carbonization may occur, such a constant low-level overheat may bring about an axle-oil failure as described above and allow catastrophic wear to axle components. Accordingly, a system which indicates to the operator when the brakes have cooled to an acceptable level would be of value to an operator trying to keep to a strict productivity schedule while still protecting the components of the vehicle.

Due to the difficulty and expense of brake repairs, it is also desirable for a log or history of overheat (or near-overheat) events to be kept. This allows the owner of the vehicle to identify a particular operator or work site with a high incidence of overheat events. The owner may then provide additional operator training or a vehicle modification, such as an axle oil cooler, to avoid further overheat events.

U.S. Pat. No. 5,079,947, issued Jan. 14, 1992 to Joachim Feldmann et al. (hereafter referenced as '947) discloses a method for the approximate determination of an average temperature of a device component of a brake device. The average temperature is determined by the deformation of the device component at the start of a brake actuation and at a point in time $t_1$ following the start, as well as by a temperature-dependent change of the elasticity module of the material of the device component. '947 calculates the brake temperature indirectly, thus avoiding the temperature sensor difficulties described above. However, the '947 method requires that a number of specialized device sensors be placed near or on the brake components, thus negating the time, resource, and efficiency savings provided by the lack of a temperature sensor.

DETAILED DESCRIPTION

Figure 1A:
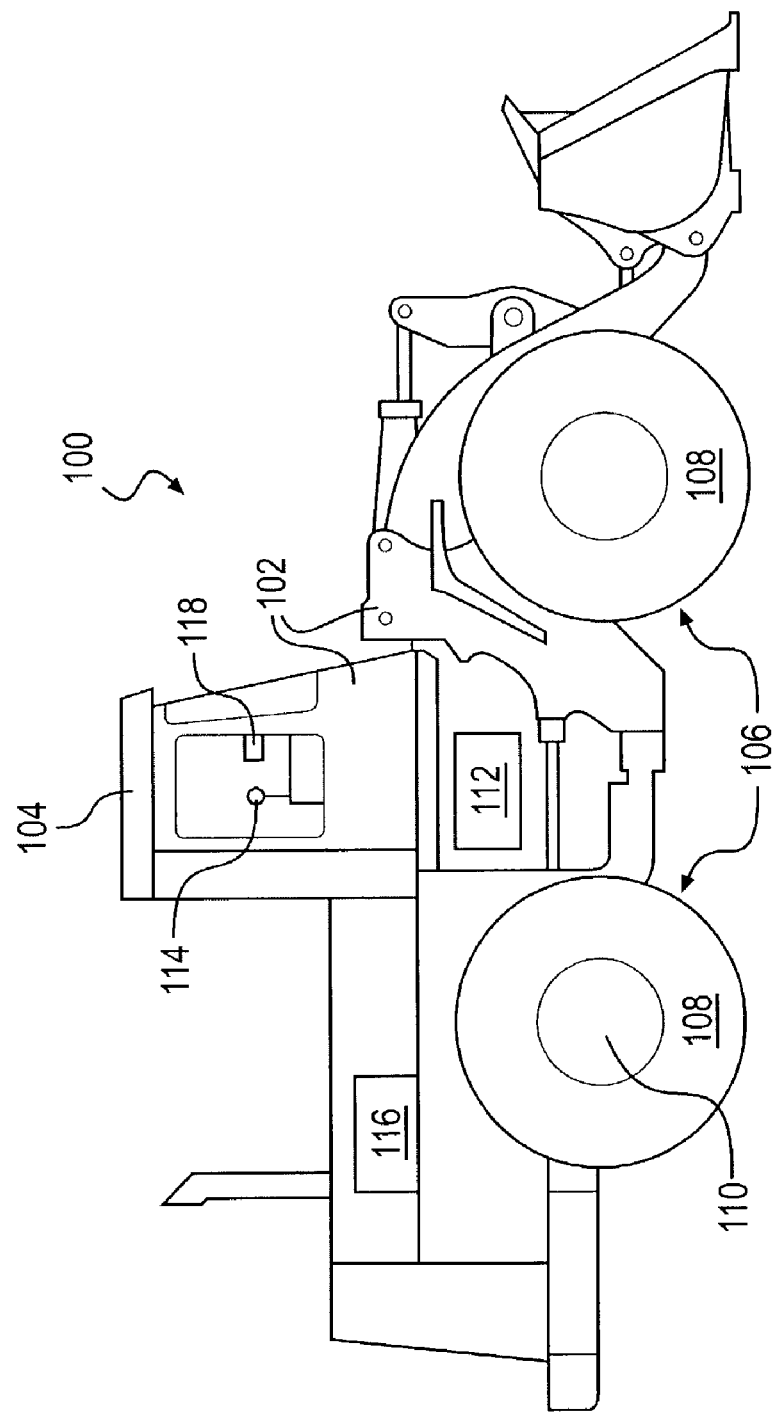
FIG. 1a depicts a side view of a vehicle including a preferred embodiment of the present invention.

FIG. 1a depicts a vehicle 100 having a machine body 102 which carries a cab 104. A ground engaging system 106 provides motive power to the vehicle 100. The ground engaging system 106 has at least one wheel 108. Two wheels 108 are shown in FIG. 1a, and it is assumed for the sake of description that the wheels 108 are mounted on axles (not shown) in a known manner. At least one wheel 108 or its axle has a brake 110 associated therewith. Again for descriptive purposes, it will be assumed herein that the brake 110 is a wet friction disc brake, but the present invention will function as intended with any of a number of known types of brake 110.

Figure 1B:
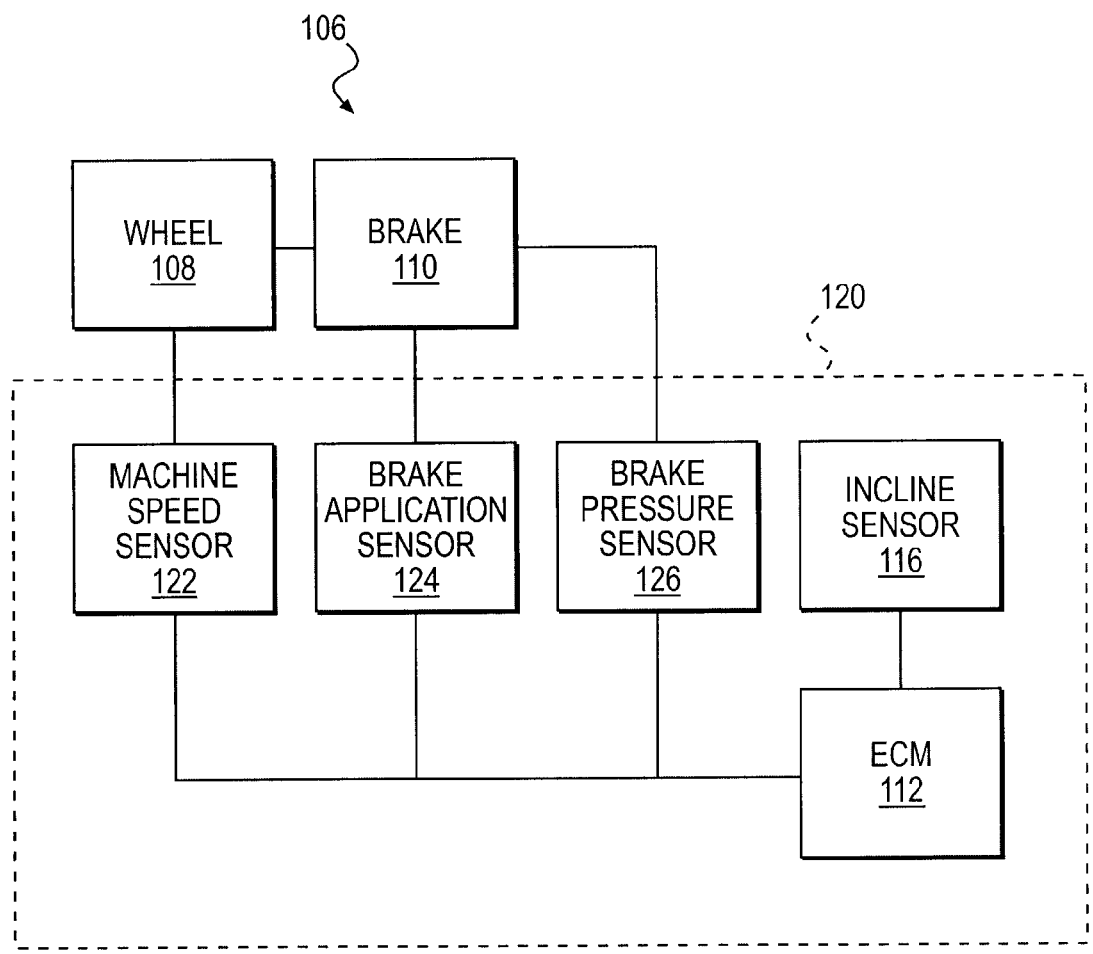
FIG. 1b depicts a schematic view of a preferred embodiment of the present invention.
Figure 2A:
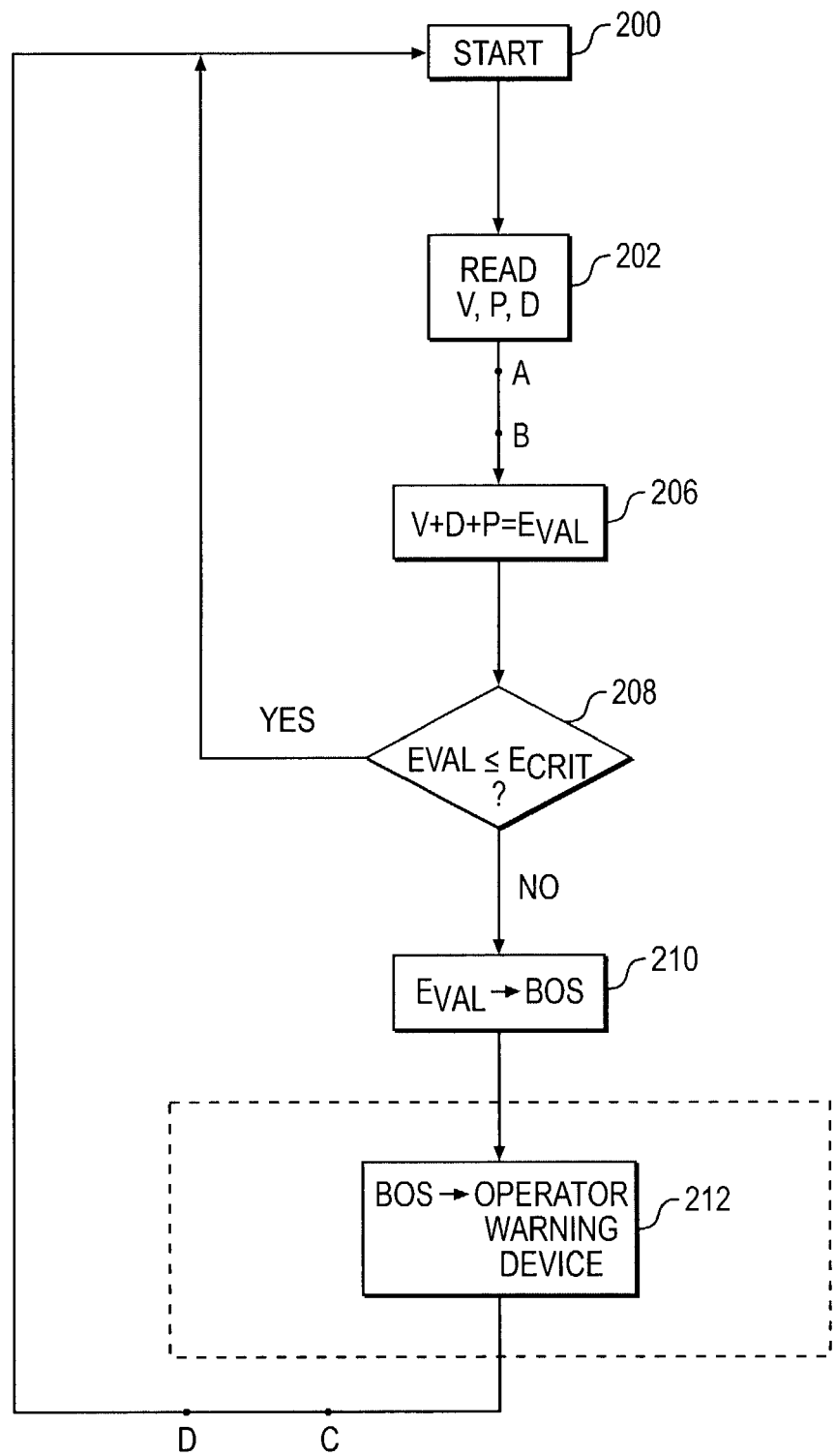
FIG. 2a depicts a flow chart of the logic of a preferred embodiment of the present invention.

A brake overheat warning system (shown generally at 120 by the dashed line) using the logic of FIG. 2a is associated with the brake 110 and is shown in FIG. 1b. The brake overheat warning system 120 includes an electronic control module (ECM) 112, a machine speed sensor 122, and a brake application sensor 124.

The machine speed sensor 122 provides a machine speed signal, representing a ground speed of the vehicle 100, to the ECM 112 in any suitable manner. One known manner of producing the machine speed signal involves timing a rotation of the wheels 108.

The brake application sensor 124 provides a brake application duration signal to the ECM 112. The brake application duration signal may be produced by timing the operator's activation of a brake control 114 or in any other suitable manner which produces a value for the length of time the brake 110 has been actuated.

The brake overheat warning system 120 preferably includes an incline sensor 116 which determines if the vehicle 100 is traveling on level ground or on a slope. A pendulum sensor is an example of a suitable incline sensor 116, though any method known in the art for measuring the incline of machine travel will suffice.

Optionally, a brake pressure value is supplied to the ECM 112. The brake pressure value may be a predetermined constant or a brake pressure sensor 126, as shown in FIG. 1b, can be used to provide a brake pressure signal based on an amount of force with which the brake is being applied to stop the wheel. The predetermined pressure value could even be omitted or set to zero, having the same effect as an omission, without harm to the present invention, if the operator or programmer of the brake overheat warning system 120 wishes to disregard the pressure of application of the brake. The below description assumes the presence of a non-zero pressure value, however.

Preferably, an operator warning device 118 alerts the operator to a possible or actual brake overheat condition, based on any suitable number or combination of the above vehicle conditions (incline, machine speed, brake application pressure, and brake application duration). This operator warning device 118 may provide a signal to the operator tactilely, visually, audibly, or in like manner. The operator warning device 118 should be of a form such that the operator will quickly notice and understand the overheat warning and take steps to rectify the overheat situation.

A brake overheat history log may also record brake overheat or other brake temperature-related events (whether or not the operator was notified of the event) for future reference. This history log may reside in the ECM 112 in a known manner or in any other retrievable format and location.

Figure 2B:
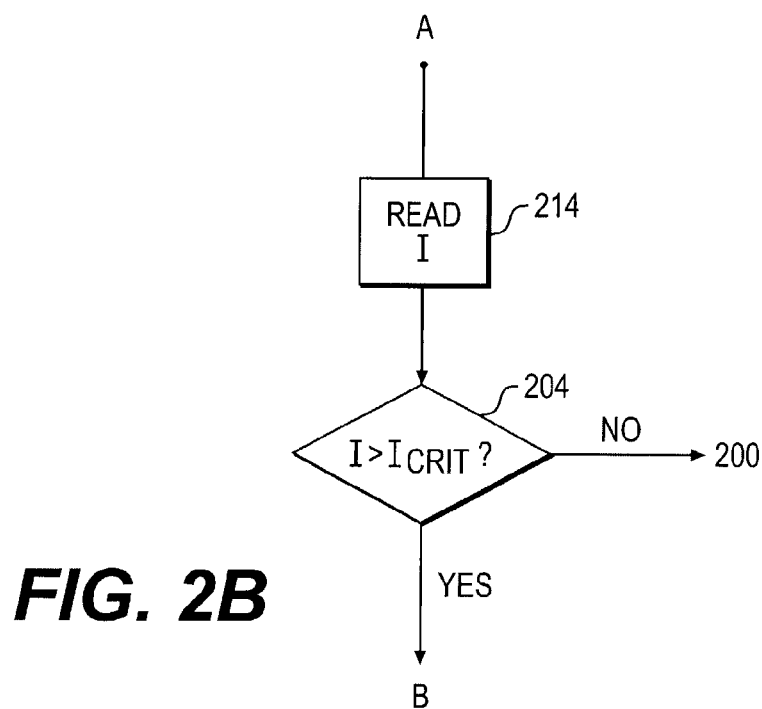
FIG. 2b depicts a flow chart of an optional subroutine of the logic of a preferred embodiment of the present invention.
Figure 2C:
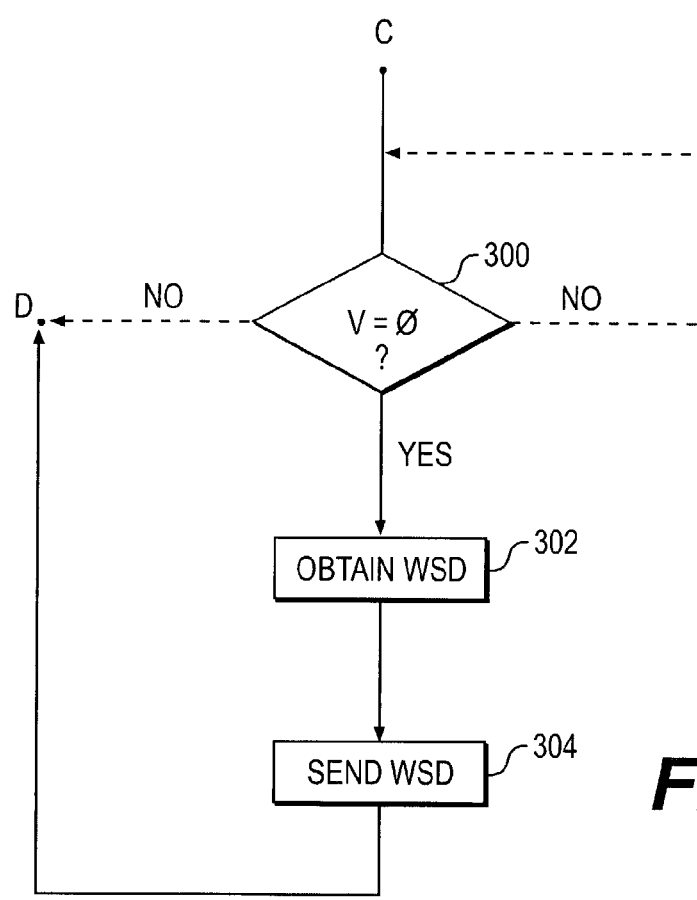
FIG. 2c depicts a flow chart of an optional subroutine of the logic of a preferred embodiment of the present invention.

The logic which transforms the vehicle conditions into an operator warning is shown in FIG. 2a, and the optional FIGS. 2b and 2c. Control starts at first control block 200 of FIG. 2a; the method of actuation of the brake overheat warning system 120 may be automatic or manual, and the brake overheat warning system 120 may operate continuously or intermittently. For the sake of description, it will be assumed herein that the brake overheat warning system 120 is active full-time. At second control block 202, the values for machine speed (V), brake application pressure (P), and brake application duration (D) are read or supplied, as discussed above.

Optionally, the logic of FIG. 2b is applied between blocks 202 and 206 of FIG. 2a, in order to bring in the incline factor of the brake overheat warning system 120. Should the incline option be included, control leaves FIG. 2a at point A. I is read at sixth control block 214. At first decision block 204, I is compared to $I_{crit}$, a predetermined value of the minimum incline, or a range of acceptable inclines, for which the brake overheat warning system 120 is operational. If I is greater than (for a fixed $I_{crit}$ value) or falls outside (for an $I_{crit}$ range) $I_{crit}$, then control returns to the logic of FIG. 2a at point B; otherwise, control returns to first control block 200 in FIG. 2a.

At third control block 206, a calculated brake overheat value $E_{val}$ is determined from V, P, and D. $E_{val}$ represents the likelihood that the brake 110 has overheated or will do so shortly, depending upon the warning type chosen by the user. The warning type (imminent or actual overheat event) may be factory-preset or chosen by an operator or owner. The precise nature of $E_{val}$ may be an equation or summing of signals, an example of which is shown in FIG. 2a, a lookup table, or any other suitable means of combining and/or weighting V, P, and D in a desired manner. Historical V, P, and D values may also be taken into account when calculating $E_{val}$. The relationship of V, P, and D which produces $E_{val}$ is specific to the vehicle and may be readily determined by one skilled in the art. Once $E_{val}$ is determined in the chosen manner, control passes to second decision block 208.

At second decision block 208, $E_{val}$ is compared to a predetermined acceptable overheat value, $E_{crit}$. $E_{crit}$ may be a single value, as shown, or a range of values called an acceptable overheat value range. The comparison may be accomplished in any suitable manner. $E_{crit}$ may be determined experimentally and represents a combination of V, P, and D which indicates a current or impending overheat event about which the operator should be warned. If $E_{val}$ falls outside the $E_{crit}$ value or range at second decision block 208 (a simple greater than/equal to comparison as shown is an example), control returns to first control block 200. Otherwise, control passes to fourth control block 210.

At fourth control block 210, a brake overheat signal (BOS) is produced. Control then passes to fifth control block 212, where the BOS is optionally, as indicated by the dashed line, sent to the operator warning device 118 and actuates the same. The BOS may instead or also be sent to a log file for historical purposes. Control then returns to first control block 200, whether or not the command in fifth control block 212 is carried out.

Optionally, the logic of FIG. 2c is included in the brake overheat warning system 120. FIG. 2c supplements FIG. 2a to provide a warning signal duration (WSD) value which indicates to the operator when the brake has or should have cooled sufficiently to resume vehicle 100 operation. The description of the present invention places the FIG. 2c logic between points C and D of FIG. 2a, but any suitable placement may be used in practice. At first decision block 300, V is compared to zero, to determine if the vehicle 100 has been stopped responsive to the BOS. If the vehicle 100 is still traveling, control follows a predetermined one of the two dashed (to signify optional) lines and either proceeds to point D of FIG. 2a, wherein the FIG. 2a logic is repeated until the vehicle 100 has stopped, or returns to first decision block 300 of FIG. 2c and "holds", or loops, until the vehicle 100 has stopped. A programmer or operator chooses one of the two dashed lines in order to provide a desired response from the brake overheat warning system 120; either path permits the brake overheat warning system 120 to operate properly.

If the vehicle 100 has stopped, control passes from first decision block 300 to first control block 302, where the WSD value is obtained. The WSD value is predetermined from a lookup table, equation, clock, or other suitable source and indicates a duration for the actuation of the operator warning device 118. The WSD is then sent to the operator warning device 118 at second control block 304. At the expiration of the WSD period, the operator warning device 118 is automatically deactivated or otherwise indicates to the operator that the vehicle 100 has been stopped for long enough that the brake should have cooled sufficiently to avoid the overheat event. The WSD value may also or instead be based on a sensed temperature of the axle or brake 110. From second control block 304, control then passes back to point D of FIG. 2a.

INDUSTRIAL APPLICABILITY

As a vehicle 100 equipped with a brake overheat warning system 120 according to the present invention travels, the ECM 112 monitors the V, P, and D values. Optionally, the logic of the brake overheat warning system 120 is employed if the I value indicates that the vehicle 100 is traveling down an incline. The brake overheat warning system 120 may also or instead be activated manually by the operator or automatically based on another characteristic of the vehicle 100.

Regardless of the method of activation, the brake overheat warning system 120 calculates the BOS as described above. If $E_{val}$ is such that a brake overheat event is occurring or imminent, the operator receives a warning via the operator warning device 118. Upon receiving the warning, the operator should stop the vehicle 100 to allow the brakes 110 to cool and avoid or lessen heat damage to the brakes 110. Preferably, the WSD loop (FIG. 2c) determines if the vehicle 100 has been stopped and then deactivates the operator warning device 118 or otherwise indicates to the operator when the brakes 110 should be cool enough that vehicle 100 travel may resume.

The activation of the operator warning device 118 may be recorded in the brake overheat history log for future reference by the operator or owner of the vehicle 100. A large number of overheat events may indicate that additional operator training or a vehicle 100 device, such as an axle oil cooler or jake brake, is appropriate.

If the vehicle 100 is not stopped responsive to the warning, such lack of response may also be recorded in the brake overheat history log and may be used as evidence of improper operation to invalidate warranty claims related to overheated brakes 110.

Other aspects, objects and advantages of this invention can be obtained from a study of the drawings, the disclosure and the appended claims.

What is claimed is:

1. A method for determining a brake overheating condition, comprising:
   sensing a travel speed of a vehicle having a brake, and responsively producing a speed signal;
   sensing an application state of the brake and responsively producing a brake application signal;
   sensing an application time of the brake and responsively producing a time signal; and
   receiving at least two of the speed signal, brake application signal, and time signal and producing a brake overheat signal based thereon.

2. The method of claim 1, including:
   receiving the brake overheat signal and responsively actuating an operator warning device.

3. The method of claim 2, including:
   actuating the operator warning device responsive to the brake overheat signal being outside a predetermined acceptable overheat signal range.

4. The method of claim 3, including:
   indicating to the operator when the brake overheat signal has returned to the predetermined acceptable overheat signal range.

5. The method of claim 1, including:
   determining an inclined state of the vehicle and responsively producing an incline signal; and
   producing the brake overheat signal responsive to the incline signal being outside a predetermined acceptable incline signal range.

6. The method of claim 1, including:
   recording values of the brake overheat signal over time; and
   providing a history log of the brake overheat signal.

7. The method of claim 1, including:
   indicating to the operator when a sufficient time interval has passed that the brake overheat signal should have returned to the predetermined acceptable overheat signal range.

8. A method for determining an overheating condition of a brake on a vehicle, comprising:
   generating a brake overheat signal based on a duration of application of the brake, a pressure of application of the brake and at least one of: a travel speed of the vehicle, and an inclined state of the vehicle; and
   activating a warning device responsive to the brake overheat signal being outside a predetermined acceptable overheat signal range.

9. A vehicle, comprising:
   a machine body;
   an operator compartment associated with the vehicle; and
   a ground engaging system providing motive power to the machine body, including at least one wheel, at least one brake associated with the wheel, and a brake overheat warning system associated with the brake, the brake overheat warning system including:
   an electronic control module;
   a machine speed sensor adapted to produce a machine speed signal;

a brake application sensor adapted to produce a brake application duration signal; and wherein the electronic control module receives the machine speed and brake application duration signals and responsively produces a brake overheat signal.

10. The vehicle of claim 9, wherein at least one of an operator warning device and a brake overheat event recording device is actuated in response to the brake overheat signal being outside a predetermined acceptable overheat signal range.

11. The vehicle of claim 9, wherein a machine incline sensor produces a machine incline signal and the electronic control module produces the brake overheat signal responsive to the machine incline signal.

12. The vehicle of claim 10, wherein a warning signal duration signal indicates to the operator when the brake overheat signal has returned to the predetermined acceptable overheat signal range.

13. The vehicle of claim 9, wherein a warning signal indicates to the operator when the brake overheat signal should have returned to the predetermined acceptable overheat signal range.

14. A method for determining a brake overheating condition of a vehicle without directly measuring any temperature, comprising:
 measuring at least a wheel speed and a brake application duration;
 using at least the wheel speed and the brake application duration to determine oyerheating information from a look-up table; and
 actuating an alarm that notifies an operator of the vehicle of the existence of a brake overheating condition if the look-up table indicates a brake overheating condition resulting from the particular combination of the wheel speed and the brake application duration.

15. A method according to claim 14 for determining a brake overheating condition of a vehicle without directly measuring any temperature, the method further comprising:
 measuring a brake application pressure; and
 using at least the wheel speed, the brake application duration, and the brake application pressure to determine overheating information from the look-up table.

16. A method for determining a brake overheating condition of a vehicle comprising:
 measuring at least a wheel speed and a brake application duration;
 processing at least the wheel speed and the brake application duration in an electronic control module (ECM) onboard the vehicle, the ECM using at least the wheel speed and the brake application duration to determine the existence of a brake overheating condition without the need for directly measuring the temperature of the brake; and actuating an alarm that notifies an operator of the vehicle when the ECM indicates a brake overheating condition.

17. A method according to claim 16 for determining a brake overheating condition of a vehicle further comprising:
 measuring a brake application pressure; and
 the ECM using at least the wheel speed, the brake application duration, and the brake application pressure to determine the existence of a brake overheating condition without the need for directly measuring the temperature of the brake.

18. A method according to claim 15 for determining a brake overheating condition of a vehicle further comprising:
 measuring a vehicle inclination; and
 the ECM using at least the wheel speed, the brake application duration, and the vehicle inclination to determine the existence of a brake overheating condition without the need for directly measuring the temperature of the brake.

19. A vehicle comprising:
 at least one wheel for supporting the vehicle;
 a brake associated with the at least one wheel;
 an electronic control module (ECM) onboard the vehicle comprising a memory and a processor, the processor using inputs from sensors to calculate when a brake overheating event has occurred because the temperature of the brake has exceeded a predetermined threshold;
 the processor activating an operator warning device for warning the operator each time a brake overheating event has occurred;
 each time the operator waning device is activated, the processor also causing information about each brake overheating event to be stored in the memory to create a brake overheat history log of brake overheat events; and
 the processor also causing information about whether the vehicle motion is stopped in response to each activation of the operator warning device to be recorded in the memory and form a part of the brake overheat history log.

20. A vehicle according to claim 19 wherein the processor calculates when a brake overheating event has occurred without directly measuring the brake's temperature.

21. A vehicle according to claim 20 wherein:
 the sensors comprise a wheel speed sensor and a brake application duration sensor; and
 none of the sensors directly measures temperature.

* * * * *